(12) United States Patent
Bae (10) Patent No.: US 6,443,382 B1
(45) Date of Patent: Sep. 3, 2002

(54) VEHICULAR SEATBELT RETRACTOR

(75) Inventor: Ki-young Bae, Kangwon-do (KR)

(73) Assignee: Sungwoo Corporation (KR)

( * ) Notice: Subject to any disclaimer, the term of this patent is extended or adjusted under 35 U.S.C. 154(b) by 0 days.

(21) Appl. No.: 09/482,205

(22) Filed: Jan. 12, 2000

(30) Foreign Application Priority Data

Dec. 9, 1999 (KR) ............................................. 99-56259

(51) Int. Cl.[7] ........................... B65H 75/48; B60R 22/36
(52) U.S. Cl. ........................... 242/382.6; 242/383.4; 242/384.5; 297/478; 280/806
(58) Field of Search ........................... 242/382.6, 383.4, 242/384.5, 384.6; 280/806; 297/478

(56) References Cited

U.S. PATENT DOCUMENTS

| | | | |
|---|---|---|---|
| 3,819,126 A | | 6/1974 | Stoffel |
| 4,148,446 A | * | 4/1979 | Sugar ...................... 242/383.4 |
| 4,238,087 A | * | 12/1980 | Makishima .............. 242/384.5 |
| 4,422,594 A | | 12/1983 | Hönl |
| 4,688,825 A | * | 8/1987 | Arbogast et al. ..... 242/382.6 X |
| 4,834,313 A | * | 5/1989 | Tsukamoto .......... 242/382.6 X |
| 4,844,375 A | * | 7/1989 | Ballet .................. 242/382.6 X |
| 5,042,738 A | | 8/1991 | Mori |
| 5,232,177 A | * | 8/1993 | Hibata ................. 242/383.4 X |
| 5,332,291 A | * | 7/1994 | Fujimurat et al. ... 242/383.4 X |
| 5,333,906 A | * | 8/1994 | Fujimurat et al. ... 242/382.6 X |
| 5,482,224 A | * | 1/1996 | Fujimura et al. .... 242/384.5 X |
| 5,507,448 A | * | 4/1996 | Park et al. ............... 242/383.4 |
| 5,593,105 A | * | 1/1997 | Schmid et al. .......... 242/383.4 |

FOREIGN PATENT DOCUMENTS

JP   2-96342   8/1990

* cited by examiner

Primary Examiner—Michael R. Mansen
(74) Attorney, Agent, or Firm—Fish & Richardson, P.C.

(57) ABSTRACT

A vehicular seatbelt retractor is provided with a webbing control device and a pawl device, in which a mass member is inserted into a first tooth portion body of a clutch wheel and is positioned in a retainer ring of a retainer, so that its wing latch faces a second sprocket of the retainer ring. The webbing control device includes a retainer, a locking element and a clutch wheel, and the pawl device includes a housing and a standing weight mounted to be rocked from side to side in the housing.

6 Claims, 7 Drawing Sheets

VEHICULAR SEATBELT RETRACTOR

BACKGROUND OF THE INVENTION

1. Field of the Invention

The present invention is related to a vehicular seatbelt and, more particularly, to a retractor for such a seatbelt, in which the winding and release prevention of a seatbelt about a spool of the retractor can be performed during an abnormal driving state (e.g., collision, or roll-over) of a vehicle.

2. Discussion of the Related Art

Generally, there has been a well-known technology in this field that a seatbelt retractor is asked to facilitate the webbing upon the wearing of the seatbelt by an occupant or to prevent the drawing-out of the webbing in an emergency or abnormal state of a vehicle. However, what is considered as a problem in this technical field is the timely detection of the abnormal state of the vehicle. To do so, a webbing sensor for detecting the pulling-out acceleration of the webbing and a motion (inertia) sensor for detecting the abnormal state of the vehicle during driving due to any sudden and/or severe disruption in traveling speed, due to the impact of a collision for example, have been developed to supplement their disadvantages to each other. Herein, it is noted that the pulling-out acceleration detection of the webbing, including its responding time, must comply with the counteracted against the abrupt rotation during running and the rollover in a slanted street and off-road conditions.

In respect of these points, a typical technology is U.S. Pat. No. 3,819,126 disclosing a seatbelt retractor with a gear wheel actuated locking means, which comprises a supporter, a reel means rotatably mounted on the side wall of the supporter, an elongated flexible seatbelt connected to the reel means, a bias means pressing the reel means in a winding direction and a locking member mounted on the reel means to be pivoted between a locking position for preventing the rotation of the reel in the unwinding direction and a pair of release positions for allowing the reel to be rotated in the unwinding direction.

Additionally, a clutch plate is slidably mounted between the side wall of the support and a ratchet and includes a conical spring mounted on the reel between the clutch plate and the support sidewall to urge the clutch plate toward frictional engagement with the ratchet. The clutch plate includes a first stop mounted on the reel to be arranged on the path of motion of the locking member. The first stop disables the locking member as the belt is being unwound from a fully wound position.

A disabling member is rotatably mounted on a pin carried on the end of the reel and includes a finger received in a slot in the support for limiting the rotational displacement, a resilient arm connected to the support to bias it in the winding direction, an arm having an enlargement connected through an opening of the locking member and ridges forming a cam of three protrusions spaced equidistantly about its center, so that it rotates through the reel as the first stop is being moved out of the path of motion of the locking member.

A wheel is rotatably mounted on the pin adjacent the disabling member and includes an annular series of regularly spaced teeth formed concentrically about the axis of rotation of the pins, a second stop constituted as a radial enlargement for engaging the locking member in its intermediate release position, a planar surface facing the disabling member, three rounded conical projections engaging the ridges and a resilient arm having a finger formed at its one end and received in an opening in the support to bias the wheel both toward the disabling member. The other end of the wheel has a foot for engaging a shoulder carried by the wheel to position the second stop to abut the locking member in its intermediate release position. The second stop disables the reel-locking device when the belt is rapidly released or unwounded from the retractor or the vehicle is in the abnormal state.

An actuator is mounted with a press fit on a pin adjacent the wheel and includes three resilient elongated pawls which are radially movable between inner and outer positions and a cylindrical shoulder rotatably supporting an inertia wheel. The inertia wheel carries three pins engaging the free ends of the pawls and has a mass selected such that it normally rotates with the actuator.

An inertia operated means is mounted adjacent the inertia wheel and includes a housing mounted on the support and a metal ball disposed in the housing to be movable on a conical base. A lever is pivotally mounted on a pin and includes a flag disposed in the opening in contact with the ball and a permanent magnet disposed adjacent the inertia wheel. The arrangement is such that when the reel is rotated in the unwinding direction by a pulling effort on the belt the inertia wheel rotates slightly with respect to the actuator to cause the pin to cam pawls radially outwardly to mate with the teeth. At that time, the wheel is connected to the reel so as to be rotated in the unwinding direction, and a Therefore, as the reel is rotated rapidly in the unwinding direction by the pulling out on the belt, the inertia wheel rotates slightly with respect to the actuator to cause the pins to cam the pawls radially outwardly to mate with the teeth. The wheel is then connected to the reel so as to be rotated in the unwinding direction. A relatively small rotation of the second stop permits the locking member to be moved by the spring toward the ratchets and a locking position that prevents further unwinding of the belt.

In the abnormal state of the vehicle, the ball becomes unseated from the opening to permit the magnet of the lever to engage the inertia wheel and thereby actuate the pawls. At that time, the reel is rotated in the unwinding direction so that the pawl is engaged with the wheel, and the locking member is engaged with the ratchets, thereby preventing the further webbing of the belt.

In order to release the locking member from the ratchets, the small amount of the belt is wound on the reel to rotate the second stop in the winding direction so as to return the locking member to its immediate position. This motion of the reel in the winding direction also rotates the actuator with respect to the inertia wheel to return the pawls to their normal inner position.

However, the seatbelt retracting device has a disadvantage in that the clutch plate, the disabling member and the wheel are required so that the locking member engaged with the ratchets of the reel should be fixed on the normal position. For example, the clutch plate is mounted between the reel ratchet and the support to be biased by the spring so that the first stop supports the locking member in a pushing direction. The disabling member its resilient arm is connected to the support to be biased in the winding direction and the enlargement of the arm is fitted into the opening of the locking member to support the locking member in the unwinding direction. The wheel includes the resilient arm and the second stop, in which the resilient arm has a finger at the outer end to be supported in the opening of the support to bias the wheel toward the disabling member and has a foot for positioning the second stop to abut the locking member in its intermediate release position.

Therefore, in order to control the retracting and releasing of the webbing, the first stop of the clutch plate determines the position of the locking member, and the second stop of the wheel disables the locking member.

Such like seatbelt retracting device has a rapid response speed in detecting the webbing and a superior restraint force of an occupant during driving in an off-road environment. However, the inertia operated means constituted as a vehicle motion sensor has complex procedures in confining the operations of the reel or ratchets, cooperating with the inertia wheel. It causes fear that the rotation restraining of the reel may be retarded.

Another technology that resolves this advantage and prevents the releasing of the webbing at a rapid speed per international standards is U.S. Pat. No. 5,507,448 assigned to this Applicant.

A seatbelt retractor comprises a ratchet wheel rotated with respect to a spool, at least a pawl member for selectively braking the spool with respect to one of its rotation directions and a device for detecting the rotation amount of the spool and braking the ratchet wheel at over a predetermined rotation amount, thereby preventing the excessive releasing of the webbing. Herein, it is noted that one pawl is engaged with the ratchet wheel in response to the operation of the webbing sensor, and as a locking ring with a slot is rotated during the operating of that the webbing releasing preventing device, the pawl stops the ratchet wheel to prevent further release of the webbing.

The seatbelt retractor has a disadvantage in that it cannot meet with the rollover phenomena of a vehicle in an off-road environment, etc., because the webbing sensor is adjusted to have a predetermined response time to the vehicle's abnormal state. In other words, the webbing restraining can be performed only after elapsing a predetermined delay time. It means that the seatbelt retractor allows some amount of the webbing releasing.

In light of these points, it is much preferable to respond to the operating of the webbing sensor at the same time and to supplement the advantages of a webbing sensor that overcomes the rollover phenomena in an off-road condition and the inertia sensor having a reliability in its operation to each another.

SUMMARY OF THE INVENTION

An object of the present invention is to provide a vehicular seatbelt retractor for performing the operations of detecting the releasing acceleration of the webbing and the abnormal state such as the colliding, simultaneously or selectively.

Another object of the present invention is to provide a vehicular seatbelt retractor for preventing the releasing of the webbing directly in response to the detection of the webbing acceleration.

Another object of the present invention is to provide a vehicular seatbelt retractor for preventing the releasing of the webbing directly in response to the detection of the vehicle's abnormal state.

Still another object of the present invention is to provide a vehicular seatbelt retractor for preventing the releasing of the webbing in response to the detections of the webbing acceleration and the vehicle's abnormal state at the same time or separately.

According to the present invention, a vehicular seatbelt retractor comprises a frame including openings formed at the center of each of foot portion, on the upper portion of which a frictional tooth portion is formed in a predetermined arc shape and a groove portion formed in a larger size than that of the opening of one foot portion and enlarged from one part of the circular arc of the opening; a spool including flanges extended in a circular arc from its both sides to be positioned on the thickness of the opening, a mounting block projected in a circular form from one side of one flange to have a smaller diameter than that of the flange and a sprocket integrally projected from one side of the other flange to be received in the groove portion; a receptacle including a first case enabling the movement of the mounting block therein and a second case receiving a spring therein; a retainer mounted at the one side adjacent the sprocket by means of a spring and including a retainer ring formed on the other side inside the circumferential portion thereof with a second sprocket formed around its inner circumference and a hook ring formed at a predetermined position of its circumference to cooperate with a guide element of a locking element; a mass member in the form of a circular body including at least one wing extended in a semi-circular arc shape from its diameter line with a latch formed at its free end and hooks projected in a predetermined distance to each another from the front side thereof; a clutch wheel including a first tooth portion formed on the inner thickness portion of an opening at its center to couple with the mass member, a coupling surface formed at its outer surface to couple with the hooks and a second tooth portion formed around the circumference thereof; and a pawl device including a housing, a standing weight including a first permanent magnet mounted on the upper portion thereof and for being able to be inclined in the housing and a pawl level mounted on the upper portion of the housing and including a second permanent magnet positioned to face at the same pole to the first permanent magnet.

The vehicular seatbelt retractor further comprises a webbing control device including the locking element cooperated with the sprocket of the spool, the retainer enabling the locking element to perform the movement of a pendulum, the mass member received in the retainer to enable at least one its latch to transfer its rotational force to the retainer and the clutch wheel enabling the wing latch to be contacted with the first tooth portion when coupled with the mass member and to be passed over the saw top of the first tooth portion at the time of the webbing accelerating.

The vehicular seatbelt retractor may further comprise the pawl device for generating the repulsive force between the first permanent magnet on the upper portion of the standing weight and the second permanent magnet on the pawl lever according to the slanting ingredient of the standing weight and coupling the pawl lever with the second tooth portion, thereby enabling the detection of the abnormal state of the vehicle.

BRIEF DESCRIPTION OF THE DRAWINGS

The present invention will now be described in detail with reference to the accompanying drawings, which are included to provide a further understanding of the invention and are incorporated in and constitute a part of this specification in order to illustrate embodiments of the invention, and which, together with the following detailed description, serve to explain the principles of the invention. In the drawings.

DETAILED DESCRIPTION OF THE PREFERRED EMBODIMENT

Figure 1:
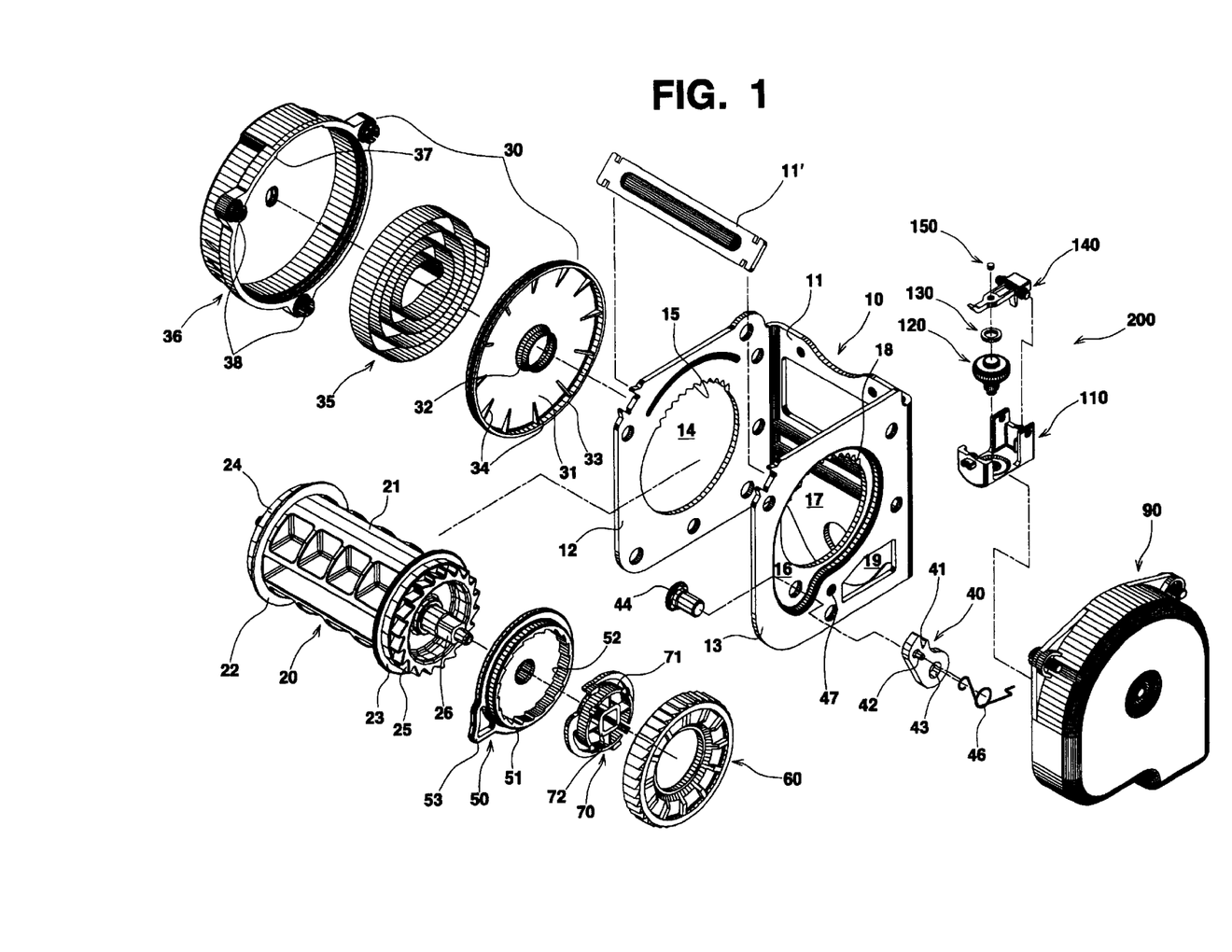
FIG. 1 is an exploded perspective view of a vehicular seatbelt retractor according to the present invention.

Referring to FIG. 1, a frame 10, having a fundamentally channel-shaped configuration, includes a rear wall 11 to be fixed to a vehicle's chassis and a pair of left and right foot portions 12 and 13 integrally extended toward the front surface from both ends of the rear wall. The left foot portion 12 includes an opening 14 formed at the center and a frictional tooth portion 15 formed in a predetermined arc at the upper portion of the opening 14. The right foot portion 13 includes an opening 17 with a frictional tooth portion 18 being formed in a predetermined arc at its upper portion, corresponding to the configuration of the left foot portion 12, and a groove portion 16 immersed inward with the opening 17 and extended in part at a predetermined direction therefrom to form a groove. The right foot portion 13 further includes a mounting hole 19 formed adjacent to and below the groove portion 16 to position a vehicle motion sensor. Also, a fixing bar 11' is mounted between the foot portions 12 and 13 to fix their interval.

Figure 2:
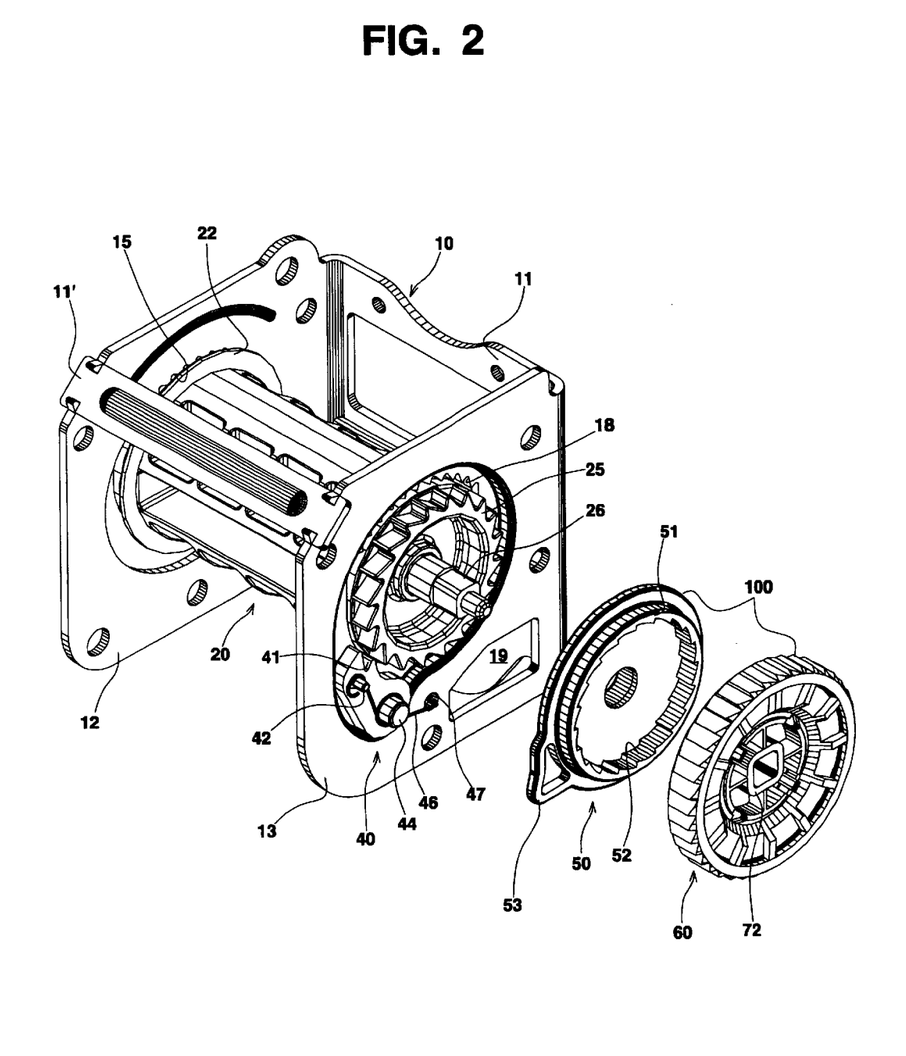
FIG. 2 is a partially exploded perspective view of a spool and a locking element mounted on a frame, in accordance with the present invention.

A spool 20 comprises a winding portion 21 for winding a webbing, left and right flanges 22 and 23 integrally formed on either side thereof to be positioned and rotated facing the openings 14 and 17, a mounting block 24 projected in a circular arc shape from the left flange 22, a first sprocket 25 integrally formed on the right flange 23 to have smaller diameter than that of the flange 23, and a shaft 26 integrally projected from the center of both ends surfaces of the spool 20. When the spool 20 is inserted into and positioned on the openings of the foot portions, the circumferential surface of the flange 22 faces the frictional tooth portion 15, the circumferential surface of the flange 23 faces the frictional tooth portion 18, and the sprocket 25 is positioned in the groove portion 16 of the right foot portion to be flush with the foot portion 13 (FIG. 2).

Normally, a retractor forces the spool 20 to wind the webbing. For this, a receptacle 30 comprises a first case 31 covering the mounting block 24 of the spool 20, a spring 35 biased in the direction that the spool 20 winds the webbing, and a second case 36 mounted on the left foot portion 12 with the first case 31 and the spring 35 being received therein. The first case 31 includes a rotational support 32 projected from its center by the thickness of the mounting block 24, to enable the shaft 26 to be passed through the first case and be rotatably supported, and a cylindrical portion 33 formed around its circumference to wrap around the mounting block 24, in which a plurality of ribs 34 are formed in a constant interval around the inner circumference of the cylindrical portion 33 to help the movement of the spool 20, so that the spool flange 22 positively causes the friction with the opening tooth portion 15 as described below. The second case 36 includes a mounting portion 37 on its opening portion, the diameter of which is larger than its body receiving the spring 35 to enable the second case 36 to be fitted thereto. A plurality of fixing means 38 are inserted into and fixed to fixing portions extended from the circumference thereof.

A webbing control device 100 is subject to preventing the releasing of the webbing responding to the detection of the webbing acceleration and freely allowing the releasing of the webbing in a normal condition of a vehicle. The webbing control device 100 comprises a locking element 40 positioned on the enlargement of the groove portion 16, a retainer 50 mounted adjacent the first sprocket 25 with the shaft 26 being passed through its center and for enabling the locking element 40 to swing as a pendulum, and a clutch wheel 60 coupled with the retainer 50 to enable the retainer 50 to be rotated.

The locking element 40 includes a latch 41 formed at the upper portion to engage with the first sprocket 25 by its pendulum movement, a guide pin 42 fixed to one surface thereof to guide its pendulum movement, and a pin hole 43 formed at the lower portion to receive a fixing pin 44 and thereby enable the locking element 40 to be pivoted. The fixing pin 44 is inserted into a hole formed in the groove portion 16 and fixed to the inner surface of the right foot portion 13. Therefore, the locking element 40 is positioned in the groove portion 16 by the fixing pin 44 and is biased in the opposite direction of the first sprocket 25 by means of a spring 46, the end of which is connected to the guide pin 42 and the other end of the which is inserted into and fixed to a hole 47 formed on the predetermined position of the right foot portion 13 as shown in FIG. 2.

Figure 5:
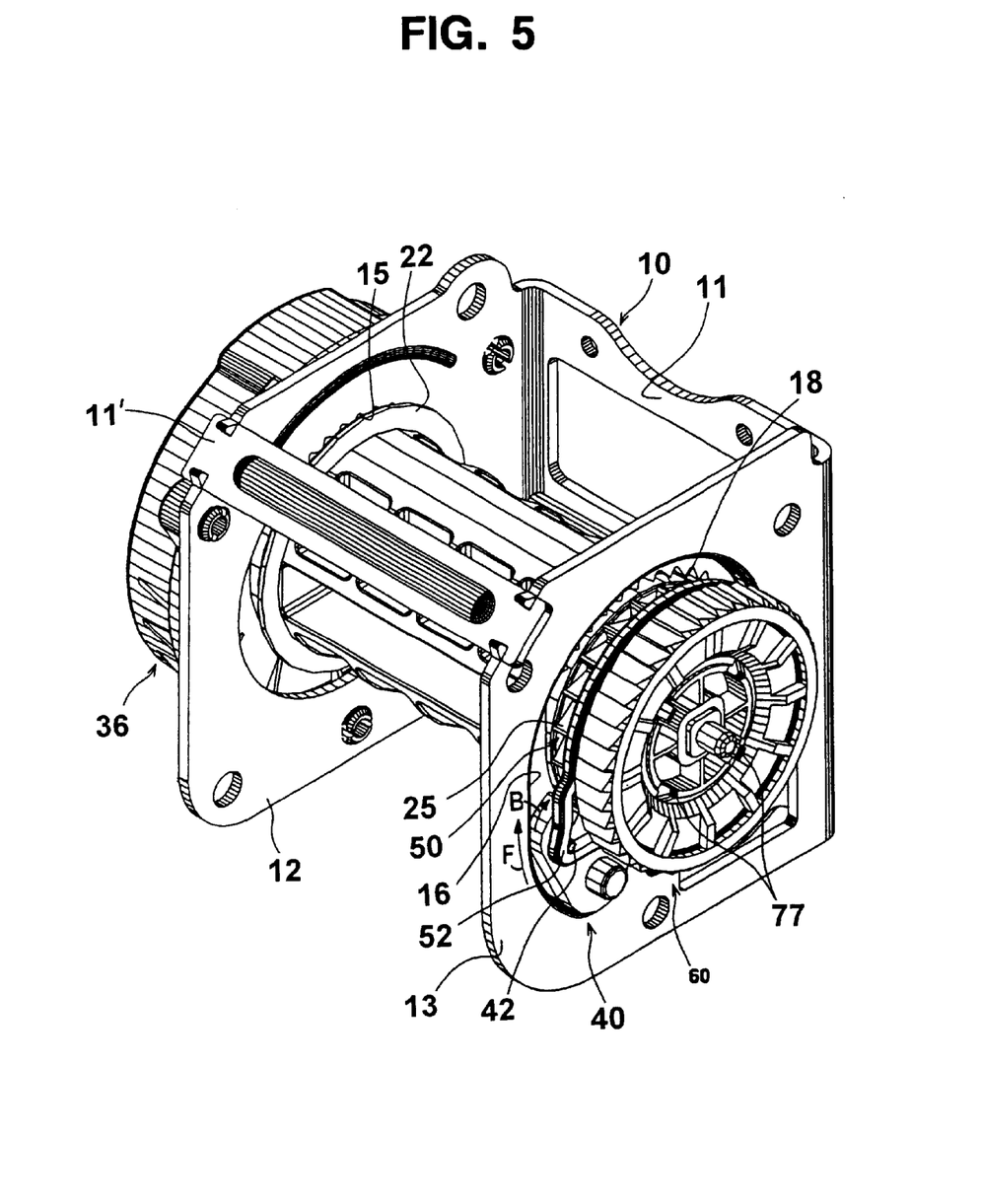
FIG. 5 is a perspective view of the state of assembling a webbing control device on the spool with a retainer, in accordance with the present invention.

The retainer 50 includes a retainer ring 51 formed around the inner circumference on one side surface thereof. A second sprocket 52 is formed in a tooth shape, having a top of a predetermined height, on the inner wall of the retainer ring 51. Also, a hook ring 53 is formed in a triangle shape at a predetermined position around the circumference of the retainer 50, to enable the pendulum movement of the locking element 40. When the retainer 50 is assembled as shown in FIG. 5, the hook ring 53 receives the guide pin 42 to be positioned at its apex. Therefore, as the retainer 50 is moved in the direction of an arrow F, the guide pin 42 moves the locking element 40 in the direction of an arrow B to engage the latch 41 with the first sprocket 25.

The clutch wheel 60 further comprises a mass member 70. The mass member 70 includes a rectangular shaft support 72, to which the rotational force of the spool shaft 26 is transferred, and a circular body 71 integrated to the rectangular shaft support 72. The circular body 71 is provided with wings 73 and 74 extended from the lower portion along the semi-circular arc of the circumference thereof. Latches 75 and 76 are formed at each end of the wings 73 and 74. Also, the mass member 71 includes a plurality of hooks 77 projected from the front surface of the circumference, as shown in FIG. 5.

Figure 3:
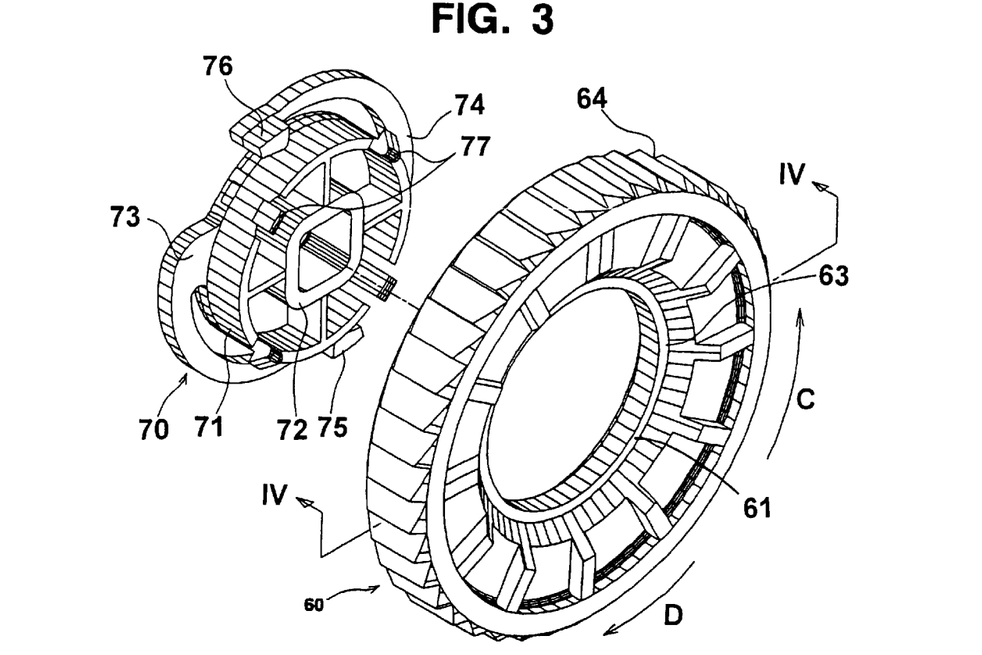
FIG. 3 is an exploded perspective view of a clutch wheel, in accordance with the present invention.
Figure 4:
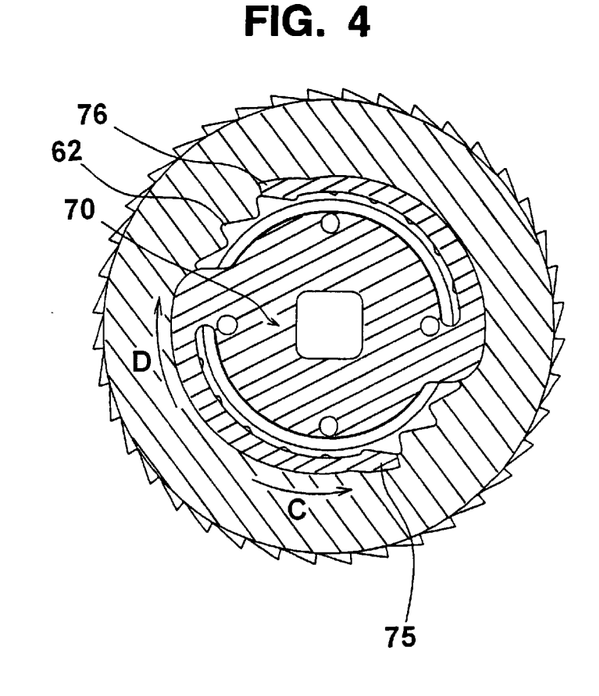
FIG. 4 is a cross-sectional view along line IV—IV, taken after assembling the clutch wheel of FIG. 3.

As shown in FIGS. 3 and 4, the clutch wheel 60 comprises an opening portion 61 formed at the center. The opening portion 61 includes a first tooth portion 62 having a predetermined width on the inner circumference thereof and a coupling surface 63 formed around the outer circumference to be coupled with the hooks 77. Also, the clutch wheel 60 includes a second tooth portion 64 formed around the outer circumference thereof to be concentric with the first tooth portion 62. Therefore, when the mass member 70 is assembled into the clutch wheel 60, the circular body 71, except for the wings 73 and 74, is inserted into and positioned in the opening portion 61, the latches 75 and 76 are contacted with the first tooth portion 62, and the hooks 77 are hung on the coupled surface 63.

The webbing control device 100 is assembled as follows. The spool 20 is mounted on the frame 10, and the locking element 40 is mounted in the groove portion 14 as shown in FIG. 2. Then, the retainer 50 is inserted onto the shaft 26 to be mounted adjacent the sprocket 25 with the guide pin 42 being positioned at the apex of the hook ring 53. The clutch wheel 60 is inserted onto the shaft 26 with the mass member 70 coupled therewith, in which the retainer ring 51 receives the first tooth portion 62 and the mass member 70, and the latches 75 and 76 of wings 73 and 74 is subject to be placed adjacent the second sprocket 52 on the inner circumference of the retainer ring 51. This assembly configuration is shown in FIG. 5.

Therefore, the webbing control device 100 detects the acceleration of the webbing. As shown in FIG. 4, the mass member 70 is inserted onto the opening portion 61 formed by a body of the first tooth portion 62 to engage the latches 75 and 76 with the first tooth portion 62. A normal state is one in which the mass member 70 and the clutch wheel 60 are simultaneously rotated in the unwinding (releasing) direction C or the winding direction D. However, at time of the webbing acceleration the mass member 70 is instantly rotated in the webbing releasing direction C, while the clutch wheel 60 is also rotated by its inertia force. The latches 75 and 76 pass over the tops of the teeth of the first tooth portion 62, so its ends are hung on the second sprocket 52 of the retainer ring 51 due to their centrifugal force. At that time, the rotational force of the shaft 26 rotates the retainer 50 in the direction of arrow F, as shown in FIG. 5. At the same time, the hook ring 52 of the retainer 50 forces the latch 41 of the locking element 40 to be engaged with the first sprocket 25 so as to stop the further rotation of the spool 20 and prevent the releasing of the webbing.

Simultaneously, as the releasing force of the webbing pulls the rotating stopped spool 20 in a webbing direction (to a frame or opening upper portion), the frictional tooth portions 15 and 18 respectively formed on the opening portions 14 and 17 become engaged with the flanges 22 and 23 to assure the prevention of the further rotation of the spool 20.

Therefore, the webbing control device 100 has a dual configuration in that, as the latches 75 and 76 are cooperated with the first tooth portion 62 of the clutch wheel 60, the retainer 50 is rotated, so the locking element 40 simply stops the rotation of the spool 20 and the frictional tooth portions 15 and 18 prevent the further rotation of the spool 20.

Figure 6:
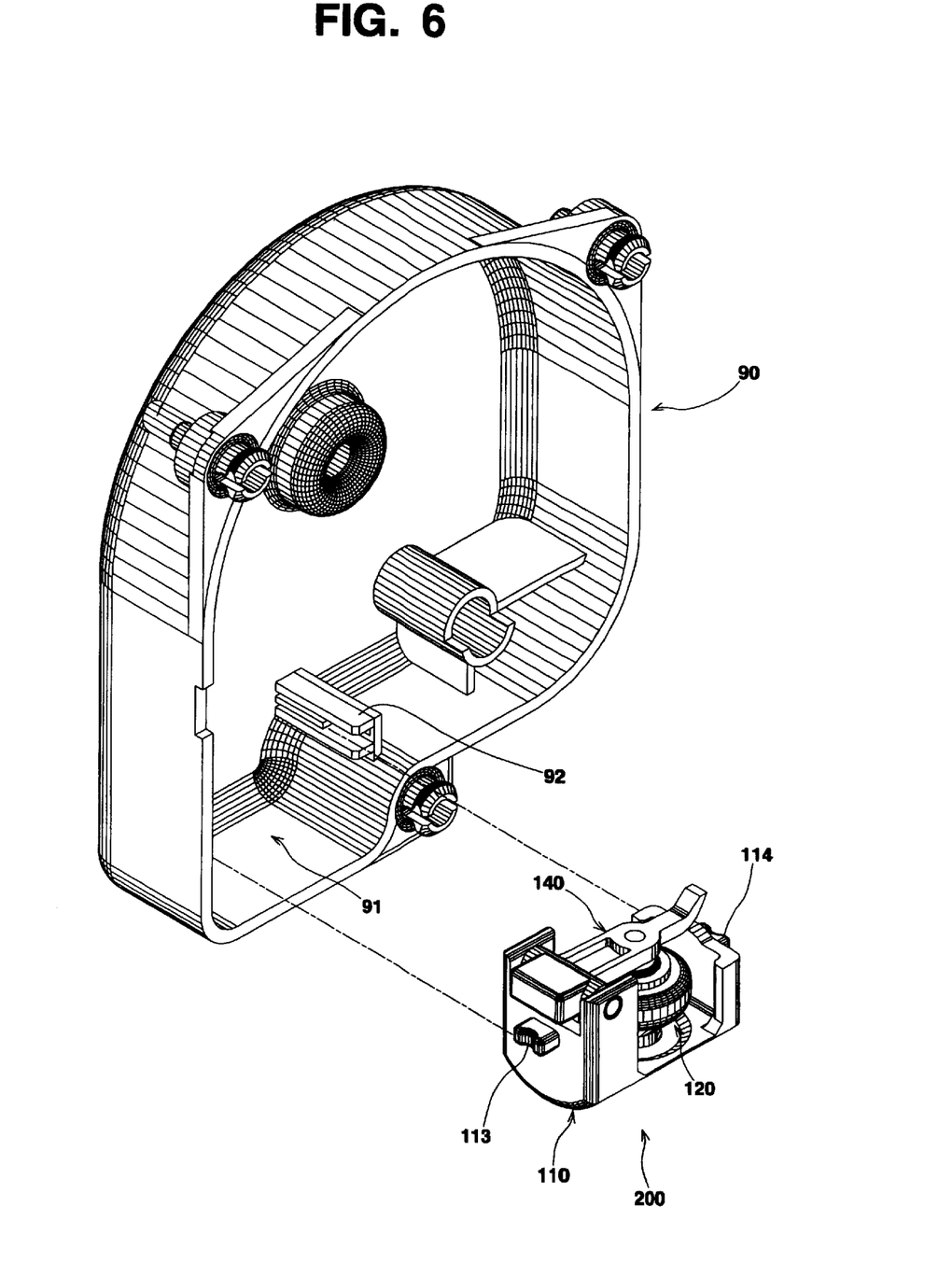
FIG. 6 is an exploded perspective view of a pawl device assembled as a vehicle motion sensor with a cover, in accordance with the present invention.
Figure 7:
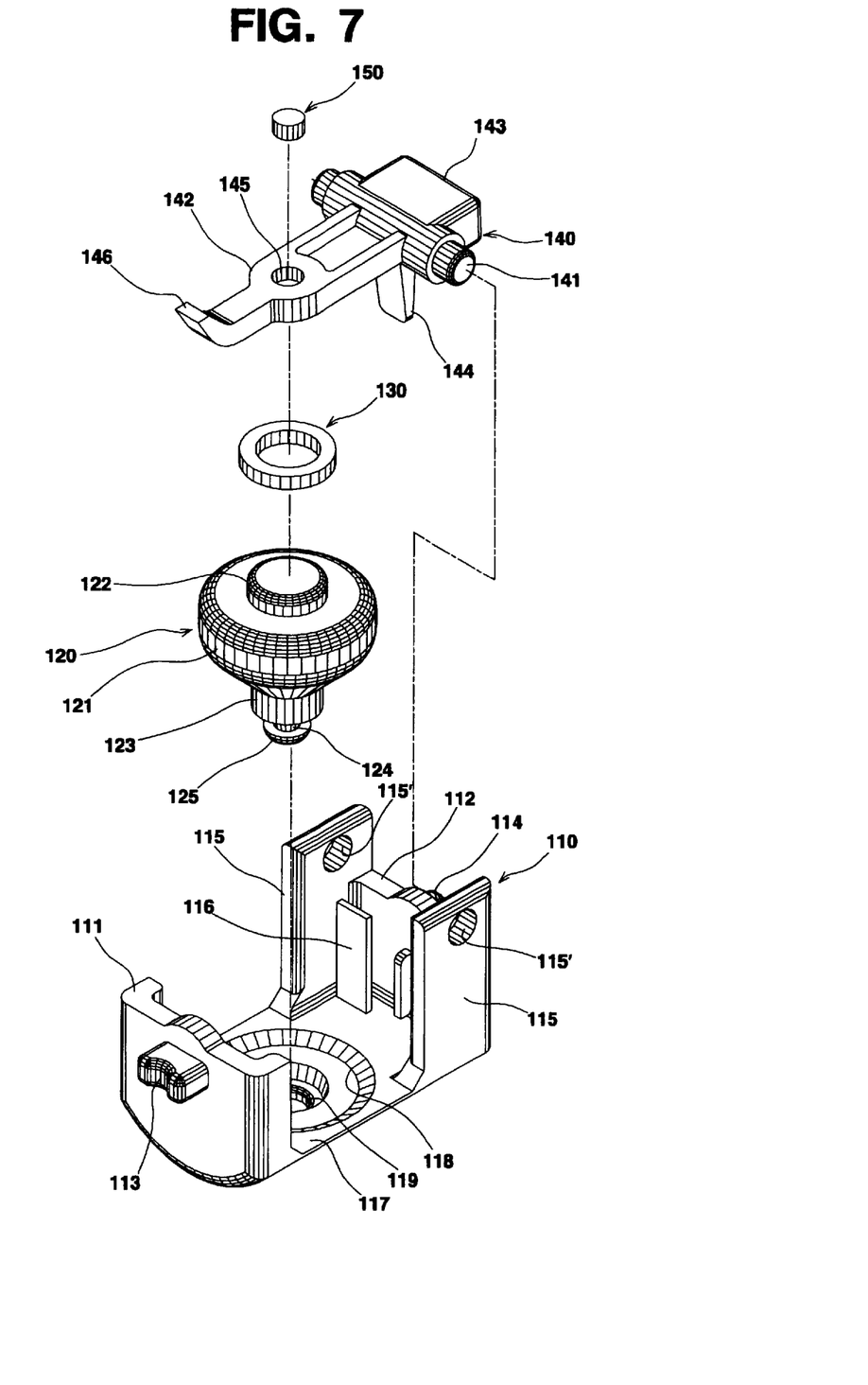
FIG. 7 is an exploded perspective view of the pawl device, in accordance with the present invention.

In addition, according to the present invention, the vehicular seatbelt retractor further comprises a pawl device 200. As shown in FIGS. 6 and 7, the pawl device 200 is mounted in the inner portion of a cover 90 and positioned in the mounting hole 19 of the frame 10 after the webbing control device 100 is assembled on the shaft 26 of the spool 20.

The cover 90 has a mounting space 91 for setting up the pawl device 200. Mount rails 92 are fixed at the same height on both sides of the mounting space 91, for example, an inner wall of the cover 90 (not shown) and a stepped shoulder, to be positioned against each other.

The pawl device 200 comprises a housing 110 and mounting blocks 113 and 114, each integrated to the longitudinal sides of front and rear walls 111 and 112, to be inserted into the rail 93. The rear wall 112 is connected at both side surfaces to side walls 115 extended inward in a predetermined distance from the housing 110. Holes 115' are formed on the side walls 115, to be coupled with a pawl lever 140 as described below. A stopping piece 116 is mounted between the side walls 115 in the housing 110 to adjust the rotating of the pawl lever 140. A seating portion 118 is formed in a stepped shape on a base 117 with a seating hole 119 on which a standing weight 120 is placed.

The standing weight 120 includes an upper cylindrical mass 121 subject to offering the center of gravity, a projector 122 formed to position a first permanent magnet 130 thereon, an extension 123 extended from the lower portion of the upper cylindrical mass 121 to have a smaller diameter than that of the mass 121, and an enlarging end portion 125 having a neck portion 124 formed to catch on the seating hole 119. The first permanent magnet 130 of a ring shape is attached to the circumference of the projector 122 by means of an adhesive agent.

The pawl lever 140 comprises a pivoting portion 141 inserted into the coupling hole 115' of the housing 10, an operating lever 142 to be engaged with the second tooth portion 164 of the clutch wheel 60, a balancing weight 143 for keeping the balance state with the operating lever 142, and a rotational support 144 for adjusting the rotating angle of the pawl lever 140 cooperating with the stop piece 116 of the housing 110. The operating level 142 includes a fixing hole 145 formed at the center, to receive a second permanent magnet 150, and a pawl end 146 to be engaged with the second tooth portion 146 of the clutch wheel 160.

Figure 8:
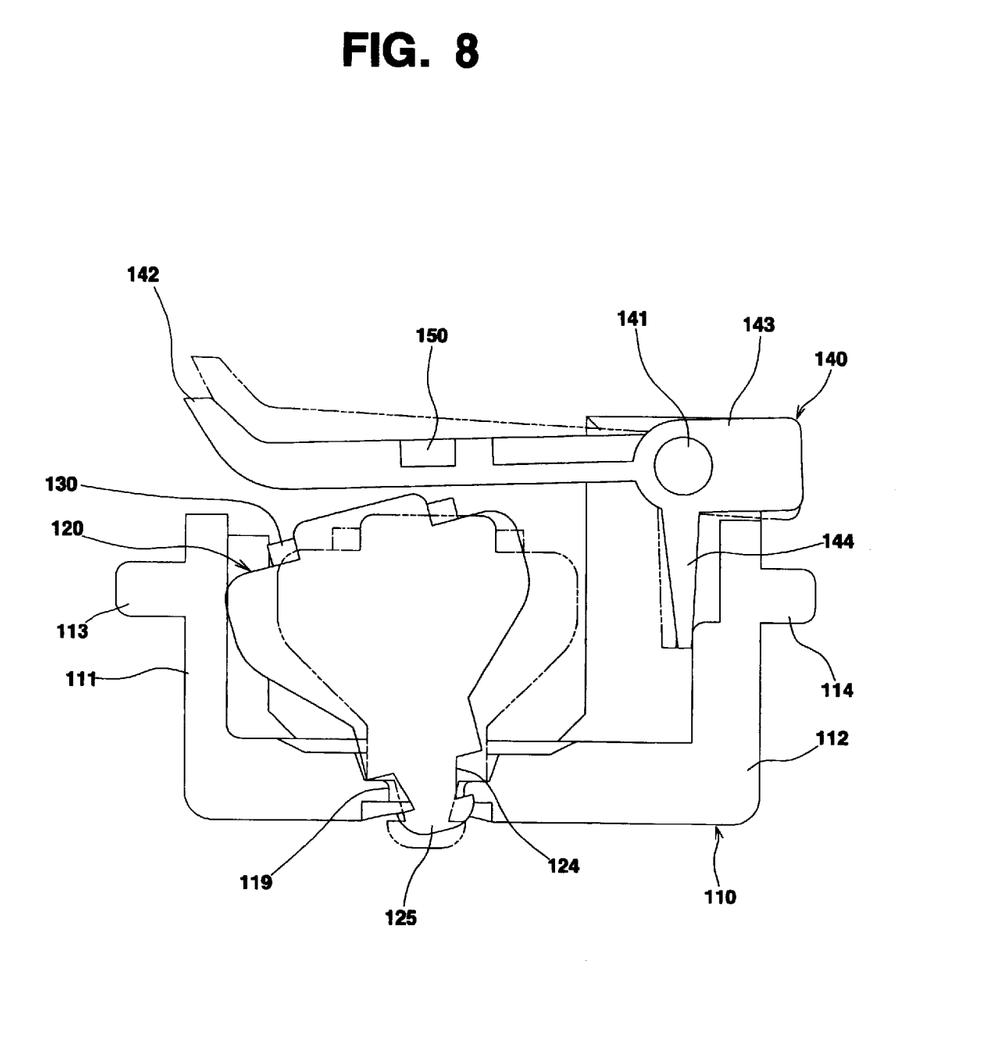
FIG. 8 is a side cross-sectional view illustrating the operating principle of the pawl device of the present invention.

Therefore, as shown in FIG. 8, the standing weight 120 is positioned in the housing 110 so that the neck portion 124 is inserted into the seating hole 119, and the enlarging end portion 125 is positioned on the lower surface of the base 117 to rock the upper cylindrical mass 121 from side to side. The pawl lever 140 is mounted on the side walls so that the rotational portion 141 is rotatably fitted into the holes 115'. After assembly the pawl lever 140 in the housing 110, the projector 122 on the upper center portion of the standing weight 120 is subject to be in position against the second permanent magnet 150 fitted into the fixing hole 145. The first and second permanent magnets 130 and 150 are mounted so that the opposing surfaces have the same polarity to cause a repelling force. Also, the pawl device 200 is mounted on the inner low portion of the cover 9 adjacent to the clutch wheel 60.

If the vehicle is under the abnormal states to be rapidly accelerated or driven in an off-road situation, the standing weight 120 is slanted in any direction from the normal position due to the vehicle's counteraction. At that time, the first and second permanent magnets 130 and 150 correspond to each other to generate a repelling force and move the second permanent magnet 150 upwardly. The upward movement causes the pawl end 146 to be engaged with the second tooth portion 64 of the clutch wheel 60. At the same time, the webbing releasing occurs, while the shaft 126 rotates the mass member 70, and the clutch wheel 60 has a momentary inertia force by the rotating force of the shaft 126 to be rotated. Thereafter, the latches 75 and 76 pass over the tops of the teeth the first tooth portion 62 to be engaged with the second sprocket 52 of the retainer ring 51 and then to rotate the retainer 50 in the unwinding direction C of the webbing. Then, the locking element 40 is moved in the direction of arrow B, as shown in FIG. 5. At the same time, the latch 41 is engaged with the first sprocket 25 to stop the further rotation of the spool 20 and prevent the releasing of the webbing.

Simultaneously, as the releasing force of the webbing pulls the rotating stopped spool 20 in the unwinding direction (to a frame or opening upper portion), the flanges 22 and 23 are respectively engaged with the frictional tooth portions 15 and 18 on the opening portions 14 and 17, to assure the prevention of the further rotation of the spool 20. This configuration can respond to the occurrences of the vehicle's abrupt acceleration as well as the abnormal state such as a roll over in an off-road condition.

As described above, the present invention reduces the webbing sensing and vehicle sensing procedures, to enhance the sensing speed as well as to provide immediate restraint to an occupant in the vehicle in response to the sensing operation.

Since the present invention may be embodied in various forms, without departing from the essential characteristics thereof, it should be understood that the above-described embodiment is not to be limited by any of the details of the foregoing description, unless otherwise specified, but should be construed only as defined in the appended claims. Thus, all modifications that fall within the scope of the claims are therefore intended to be embraced thereby.

What is claimed is:

1. A vehicular seatbelt retractor for winding and releasing a length of webbing from spool, said vehicular seatbelt retractor comprising:
    a frame, including:
        openings formed at the center of each of a pair of foot portions, on an upper portion of each of which a frictional tooth portion is formed in a predetermined arc, and
        a groove portion having a larger size than that of the opening of one foot portion and larger than a circular arc portion of the openings;
    a spool including:
        a pair of flanges, extended in a circular arc from either side of said spool, to be positioned adjacent each of the pair of foot portions,
        a mounting block, projected in a circular form from one side of one flange, to have a smaller diameter than that of the flanges, and
        a first sprocket integrally projected from one side of another flange to be received in the groove portion;
    a receptacle including:
        a first case enabling the movement of the mounting block therein, and
        a second case receiving a spring therein;
    a webbing control device including:
        a locking element cooperated with the first sprocket of the spool,
        a retainer, mounted adjacent the first sprocket, having a hook ring coupled to a guide pin of the locking element, and
        a clutch wheel, coupled with a mass member, wherein upon webbing acceleration, the mass member forces a latch of a wing of the mass member to be passed over the tops of the teeth of a first tooth portion of the clutch wheel; and
        a pawl device, mounted in the lower inner portion of a cover adjacent the clutch wheel, to engage a pawl end using a second tooth portion of the clutch wheel.

2. The vehicular seatbelt retractor as claimed in claim 1, wherein said receptacle further comprises:
    a plurality of ribs formed at a predetermined interval around an inner circumference thereof, to guide the deflection of the spool in contact with the mounting block,
    wherein the first case includes a rotational support to rotatably support the shaft of the spool at its center.

3. The vehicular seatbelt retractor as claims in claim 1, wherein the retainer includes a retainer ring receiving a first tooth portion of the clutch wheel and the mass member in the assembly of a system, around the circumference of which a second sprocket is formed on the retainer ring.

4. The vehicular seatbelt retractor as claimed in claim 1, wherein the mass member is in the form of a circular body and includes at least one wing extended in a semi-circular arc with a latch formed at a free end of the wing, and a plurality of hooks projecting a predetermined distance from a front side of the wing thereof.

5. The vehicular seatbelt retractor as claimed in claim 1, wherein the clutch wheel comprises:
    a first tooth portion formed on an inner thickness portion of an opening to couple with the mass member;
    a coupling surface formed at an outer surface of the coupling surface to couple with a plurality of hooks; and
    a second tooth portion formed around the circumference thereof.

6. The vehicular seatbelt retractor as claimed in claim 1, wherein the pawl device comprises:
    a housing;
    a standing weight including a first permanent magnet mounted on the upper portion thereof and for being able to be freely inclined in the housing; and
    a pawl lever mounted on the upper portion of the housing and including a second permanent magnet positioned to face at the same pole to the first permanent magnet.

* * * * *

UNITED STATES PATENT AND TRADEMARK OFFICE
CERTIFICATE OF CORRECTION

PATENT NO.     : 6,443,382 B1
DATED          : September 3, 2002
INVENTOR(S)    : Ki-Young Bae It is certified that error appears in the above-identified patent and that said Letters Patent is hereby corrected as shown below:

<u>Title page,</u>
Item [73], Assignee, "Sungwoo Corporation" should read -- Delphi Automotive Systems Sungwoo Corporation --.

Signed and Sealed this

Twelfth Day of August, 2003

JAMES E. ROGAN
*Director of the United States Patent and Trademark Office*